US010814869B2

(12) United States Patent
Sogabe

(10) Patent No.: US 10,814,869 B2
(45) Date of Patent: Oct. 27, 2020

(54) VEHICLE CONTROL SYSTEM AND VEHICLE CONTROL DEVICE

(71) Applicant: DENSO CORPORATION, Kariya, Aichi-pref. (JP)

(72) Inventor: Haruhiko Sogabe, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 174 days.

(21) Appl. No.: 16/098,520

(22) PCT Filed: Apr. 12, 2017

(86) PCT No.: PCT/JP2017/014896
§ 371 (c)(1),
(2) Date: Nov. 2, 2018

(87) PCT Pub. No.: WO2017/195520
PCT Pub. Date: Nov. 16, 2017

(65) Prior Publication Data

US 2019/0152474 A1 May 23, 2019

(30) Foreign Application Priority Data

May 11, 2016 (JP) ................................ 2016-095608

(51) Int. Cl.
*B60Q 9/00* (2006.01)
*B60W 30/095* (2012.01)
(Continued)

(52) U.S. Cl.
CPC ......... *B60W 30/0956* (2013.01); *B60Q 9/008* (2013.01); *B60R 21/00* (2013.01);
(Continued)

(58) Field of Classification Search
CPC .... B60W 30/0956; B60W 30/09; G08G 1/09; G08G 1/166; B60R 21/00; B60Q 9/008
(Continued)

(56) References Cited

U.S. PATENT DOCUMENTS

2005/0088318 A1* 4/2005 Liu ...................... G08G 1/0965 340/902
2007/0040700 A1* 2/2007 Bachelder .............. G08G 1/087 340/902
(Continued)

FOREIGN PATENT DOCUMENTS

JP 2001266291 A 9/2001
JP 2007176355 A 7/2007
(Continued)

OTHER PUBLICATIONS

"Error Analysis and Performance Evaluation of a Future-Trajectory-Based Cooperative Collision Warning System" by Jihua Huang et al., IEEE Transaction on Intelligent Transportation Systems, IEEE, vol. 10, No. 1, Mar. 1, 2009, pp. 175-180.

*Primary Examiner* — Peter D Nolan
*Assistant Examiner* — Wae L Louie
(74) *Attorney, Agent, or Firm* — Harness, Dickey & Pierce, P.L.C.

(57) ABSTRACT

A first vehicle control device generates and outputs a first vehicle packet that includes first vehicle information and a first time indicating a time when the first vehicle information is acquired. A second vehicle control device includes a reception determining portion successively determining whether the first vehicle packet is received, a second time acquisition portion acquiring a second time indicating a time when the first vehicle packet is received, a delay calculation portion calculating a communication delay time that is a difference between the first time and the second time, and a second vehicle control portion performing a delay consid-
(Continued)

ering control that is set by changing a delay ignoring control based on the communication delay time, the delay ignoring control being a vehicle control determined based on the first vehicle information when assuming that the first time and the second time are same.

10 Claims, 7 Drawing Sheets

(51) Int. Cl.
*G08G 1/09* (2006.01)
*B60R 21/00* (2006.01)
*B60W 30/09* (2012.01)
*G08G 1/16* (2006.01)

(52) U.S. Cl.
CPC ............... *B60W 30/09* (2013.01); *G08G 1/09* (2013.01); *G08G 1/166* (2013.01)

(58) Field of Classification Search
USPC .......................................................... 701/117
See application file for complete search history.

(56) References Cited

U.S. PATENT DOCUMENTS

2009/0198440 A1* 8/2009 Shiraki .................. G08G 1/163 701/117
2009/0212934 A1* 8/2009 Shiraki .................. G08G 1/163 340/466
2009/0300026 A1* 12/2009 Masuda .................. G06F 16/10
2010/0256835 A1* 10/2010 Mudalige ............... G08G 1/164 701/2
2010/0324775 A1* 12/2010 Kermani ................ G07C 5/008 701/31.4
2013/0116861 A1* 5/2013 Nemoto ................ B60W 30/16 701/2
2013/0131949 A1* 5/2013 Shida ........................ B60T 7/00 701/96
2013/0249279 A1* 9/2013 Sogabe ................... B60R 16/03 307/9.1
2015/0279215 A1* 10/2015 Shibata .................. G08G 1/166 340/435
2015/0294568 A1* 10/2015 Shibata .................. G08G 1/056 701/465
2016/0107609 A1* 4/2016 Sogabe ................ A61B 5/7282 340/436
2016/0148505 A1* 5/2016 Mizuguchi ............. G08G 1/093 701/41
2016/0148511 A1* 5/2016 Shibata ............ G08G 1/096758 701/119
2016/0155329 A1* 6/2016 Goto ................ G08G 1/096741 340/903
2017/0140648 A1* 5/2017 Sogabe .............. G08G 1/09675
2017/0162052 A1* 6/2017 Sogabe ................... B60R 21/00
2019/0152474 A1* 5/2019 Sogabe ............. B60W 30/0956

FOREIGN PATENT DOCUMENTS

JP 2008-236477 A 10/2008
JP 2010-173349 A 8/2010
JP 2012066606 A 4/2012
JP 2015064733 A 4/2015
WO WO-2012/014040 A1 2/2012

* cited by examiner

| ATTENTION-CALLING LEVEL | OUTPUT STYLE | | ATTENTION-CALLING MESSAGE |
|---|---|---|---|
| | FLASHING INTERVAL | FLASHING BRIGHTNESS | |
| DEFAULT | NO FLASHING | NO FLASHING | LOW-LEVEL MESSAGE |
| +1 | LONG | LOW | MEDIUM-LEVEL MESSAGE |
| +2 | MEDIUM | MEDIUM | MEDIUM-LEVEL MESSAGE |
| +3 | SHORT | HIGH | HIGH-LEVEL MESSAGE |

VEHICLE CONTROL SYSTEM AND VEHICLE CONTROL DEVICE

CROSS REFERENCE TO RELATED APPLICATIONS

This application is a U.S. National Phase Application under 35 U.S.C. 371 of International Application No. PCT/JP2017/014896 filed on Apr. 12, 2017. This application is based on and claims the benefit of priority from Japanese Patent Application No. 2016-095608 filed on May 11, 2016. The entire disclosures of all of the above applications are incorporated herein by reference.

TECHNICAL FIELD

The present disclosure relates to a vehicle control system and a vehicle control device, and more particularly, to a technique of performing control based on a signal received by wireless communication.

BACKGROUND ART

Various vehicle control systems and vehicle control devices in the related art perform a control based on a signal received by wireless communication. For example, a device disclosed in Patent Literature 1 transmits a message including a location and a behavior of a subject vehicle to surroundings of the subject vehicle when the location of the subject vehicle comes close to a crossing point. A vehicle present near the subject vehicle receives the message. In a case where the message receiver vehicle is headed for the crossing point and a distance to the crossing point is equal to or less than a predetermined distance, the message receiver vehicle outputs attention-calling information for calling attention to the subject vehicle from a speaker or a display.

PRIOR ART LITERATURE

Patent Literature

Patent Literature 1: JP 2015-64733 A

SUMMARY OF INVENTION

In transmission and reception of a signal by wireless communication, a communication device at a transmitter end is not always allowed to transmit a transmission signal (hereinafter, referred to as a transmission packet) as soon as the transmission packet is generated. For example, when a transmission packet is transmitted by using CSMA with CA (Carrier Sense Multiple Access with Collision Avoidance), the communication device has to wait until availability of a communication channel is confirmed.

In addition, processing to generate a transmission packet requires a time. More specifically, after information forming main data, such as a location of a vehicle, is acquired, a time is required to process data separately in an application layer, a data link layer, a physical layer and the like.

Meanwhile, a communication device at a receiver end of the transmission packet has to perform processing to demodulate and decode a received packet and processing to extract the main data after the modulated and decoded data is processed in the respective layers, such as the physical layer. Hereinafter, a time required for a series of steps of the processing from acquisition of information forming the main data at the transmitter end to extraction of the information at the receiver end will be referred to as a communication delay time.

Even when a vehicle control device and a vehicle control system are configured to call attention at an instance when a distance from a vehicle to a crossing point becomes equal to a distance to call attention (hereinafter, referred to as an attention-calling distance) as a procedure, the distance from the vehicle to the crossing point becomes shorter than the attention-calling distance by the time attention is called because of the communication delay time.

An inventor of the present disclosure has discovered that there is a possibility of the communication delay time becoming many times longer than a transmission period. When many transmission devices are present in a small area, a possibility of the transmission delay time becoming many times longer than a transmission period is increased.

The possibility is increased when many transmission devices are present in a small area because a waiting time caused by using the CSMA with CA tends to be longer and also because a processing waiting time when a transmission packet is generated and a processing waiting time in the communication device at the receiver end tend to be longer due to a large volume of processing performed by a control portion in the transmission device.

When the transmission delay time becomes many times longer than the transmission period, a control based on information transmitted and received by wireless communication may be delayed considerably.

A case where control contents are to notify a driver of attention-calling information will now be taken as an example. Herein, information informing that a distance from a first vehicle to a crossing point has become equal to the attention-calling distance is transmitted from the first vehicle to a second vehicle. Attention is called in the second vehicle by assuming that a distance from the first vehicle to the crossing point is equal to the attention-calling distance. When attention is called in a state where a distance from the first vehicle to the crossing point is shorter than the attention-calling distance, attention at an insufficient level is called, which causes the driver to have a feeling of strangeness.

In an example where control contents are to automatically control a behavior of a vehicle, because the automatic control is supposed to be performed when a distance from the first vehicle to the crossing point is equal to the attention-calling distance, an amount of control may become insufficient by performing the automatic control when the distance becomes shorter than the attention-calling distance.

In view of the foregoing circumstances, the present disclosure has an object to provide a vehicle control system and a vehicle control device capable of restricting a control from becoming insufficient even when there is a communication delay time.

A vehicle control system according to a first aspect of the present disclosure includes a first vehicle control device used in a first vehicle and a second vehicle control device used in a second vehicle. The first vehicle control device includes a first vehicle information acquisition portion acquiring first vehicle information based on which the second vehicle control device in the second vehicle starts a vehicle control against the first vehicle, a vehicle packet generation portion acquiring a first time indicating a time when the first vehicle information is acquired and generating a first vehicle packet including the first time and the first vehicle information, and a first vehicle transmission portion transmitting the first vehicle packet. The second vehicle control device includes a second vehicle reception portion receiving the first vehicle packet, a reception determining portion acquiring a signal received by the second vehicle reception portion and successively determining whether the first vehicle packet is received, a second time acquisition portion acquiring a second time indicating a time when the reception determining portion determines that the first vehicle packet is received, a delay calculation portion calculating a communication delay time that is a difference between the first time included in the first vehicle packet received by the second vehicle reception portion and the second time acquired by the second time acquisition portion, and a second vehicle control portion performing a delay considering control that is set by changing a delay ignoring control based on the communication delay time, the delay ignoring control being the vehicle control set based on the first vehicle information when assuming that the first time and the second time are same.

Conventionally, control contents are determined without consideration of a time from acquisition of the first vehicle information in the first vehicle to a determination of reception of the first vehicle information in the second vehicle. In short, conventionally, the delay ignoring control of the present disclosure is performed. By contrast, in the present disclosure, the delay considering control is performed by changing the delay ignoring control based on the communication delay time that is the difference between the first time when the first vehicle information is generated and the second time when reception of the first packet including the first vehicle information is determined. Hence, the control can be restricted from becoming insufficient even when there is the communication delay time.

A vehicle control device according to a second aspect of the present disclosure corresponds to the second vehicle control device included in the vehicle control system according to the first aspect, is a control device used in a vehicle, and includes a reception portion receiving a peripheral vehicle packet that is a vehicle packet transmitted from a peripheral vehicle in a periphery of a subject vehicle using the vehicle control device and including peripheral vehicle information based on which the vehicle control device starts a vehicle control against the peripheral vehicle and a first time indicating a time when the peripheral vehicle information is generated, a reception determination portion acquiring a signal received by the reception portion and determining whether the peripheral vehicle packet is received, a second time acquisition portion acquiring a second time indicating a time when the reception determining portion determines that the peripheral vehicle packet is received, a delay calculation portion calculating a communication delay that is a difference between the first time included in the peripheral vehicle packet received by the reception portion and the second time acquired by the second time acquisition portion, and a vehicle control portion performing a delay considering control that is set by changing a delay ignoring control based on the communication delay time, the delay ignoring control being the vehicle control set based on the peripheral vehicle information when assuming that the first time and the second time are same.

A vehicle control device according to a third aspect of the present disclosure is the vehicle control device according to the second aspect of the present disclosure modified by omitting the vehicle control portion and including an output portion that outputs information to the vehicle control portion instead.

Namely, a vehicle control device according to the third aspect of the present disclosure is a vehicle control device used in a vehicle and includes a reception portion receiving a peripheral vehicle packet that is a vehicle packet transmitted from a peripheral vehicle in a periphery of a subject vehicle using the vehicle control device and including peripheral vehicle information based on which the vehicle control device starts a vehicle control against the peripheral vehicle and a first time indicating a time when the peripheral vehicle information is generated, a reception determination portion acquiring a signal received by the reception portion and successively determining whether the peripheral vehicle packet is received, a second time acquisition portion acquiring a second time indicating a time when the reception determination portion determines that the peripheral vehicle packet is received, a delay calculation portion calculating a communication delay that is a difference between the first time included in the peripheral vehicle packet received by the reception portion and the second time acquired by the second time acquisition portion, and a delay time output portion outputting the communication delay time calculated by the delay calculation portion to a vehicle control portion that is used in the subject vehicle and performs a control determined based on the peripheral vehicle information.

The control can be restricted from becoming insufficient even when there is the communication delay time also by the vehicle control device of the second aspect and the vehicle control device of the third aspect.

BRIEF DESCRIPTION OF DRAWINGS

The above and other objects, features and advantages of the present disclosure will become more apparent from the following detailed description made with reference to the accompanying drawings. In the drawings.

EMBODIMENT FOR CARRYING OUT INVENTION

Hereinafter, an embodiment of the present disclosure will be described with reference to the drawings. A vehicle control system 100 shown in FIG. 1 includes multiple in-vehicle systems 1 and a center 5.

The multiple in-vehicle systems 1 are mounted to multiple vehicles 2, respectively. In an example of FIG. 1, an in-vehicle system 1*a* is mounted to a first vehicle 2*a* and an in-vehicle system 1*b* is mounted to a second vehicle 2*b*. The in-vehicle system 1*a* mounted to the first vehicle 2*a* corresponds to a first vehicle control device and also to a vehicle control device. The in-vehicle system 1*b* mounted to the second vehicle 2*b* corresponds to a second vehicle control device and also to the vehicle control device.

Figure 1:
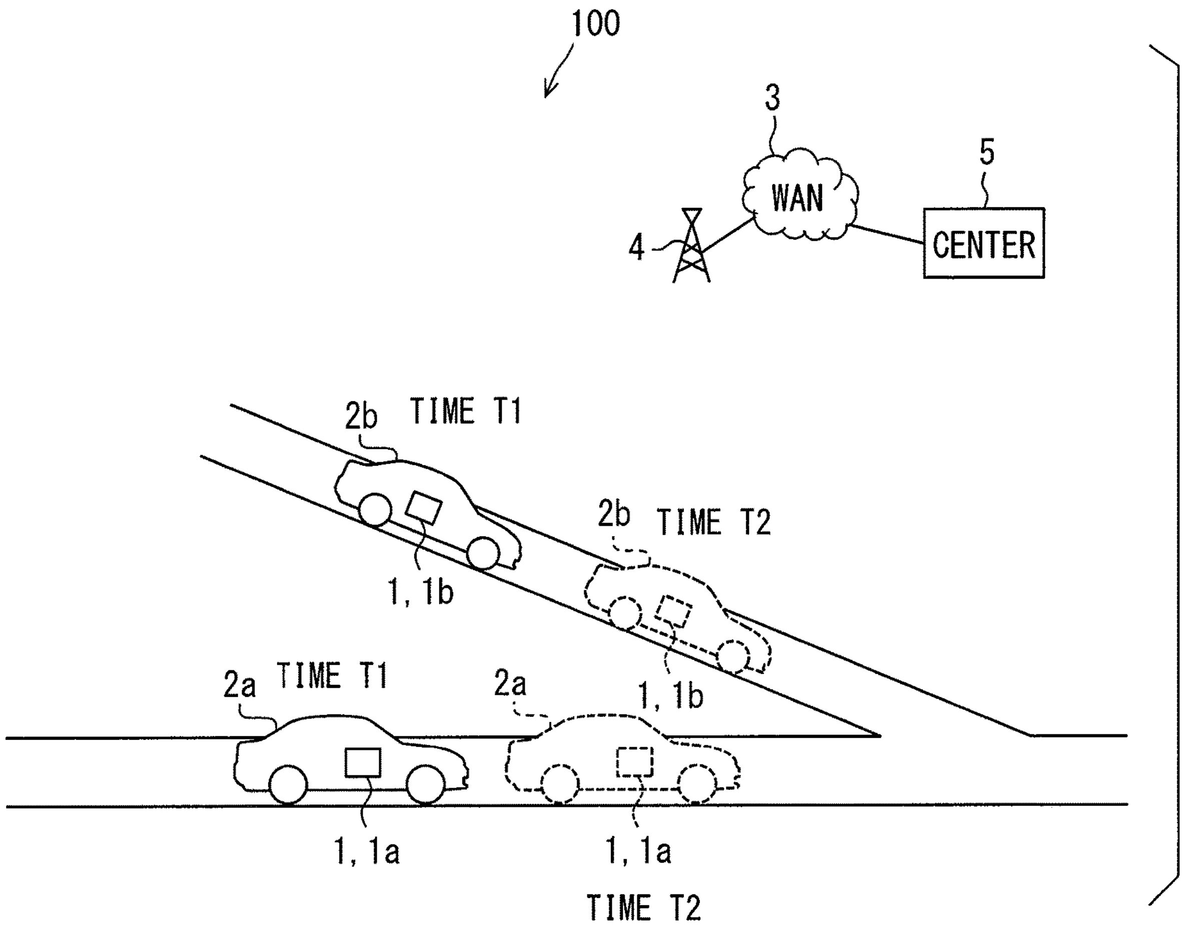
FIG. 1 is a view showing an example of a schematic configuration of a vehicle control system according to an embodiment of the present disclosure.

The in-vehicle systems 1*a* and 1*b* are of a same configuration except that each is mounted to a different vehicle. When the in-vehicle systems 1*a* and 1*b* are not distinguished from each other, each will be referred to simply as the in-vehicle system 1. Likewise, when the first vehicle 2*a* and the second vehicle 2*b* are not distinguished from each other, each will be referred to simply as the vehicle 2. In FIG. 1, only two vehicles 2 each incorporating the in-vehicle system 1 are shown. It should be appreciated, however, that the in-vehicle system 1 may be mounted to three or more vehicles 2.

[Overall Summary]

The in-vehicle systems 1 mounted to the respective vehicles 2 wirelessly communicate with each other. The vehicle 2 is not particularly limited and may be any road vehicle, which includes a four-wheel vehicle, a motorcycle, a bicycle, and so on.

The in-vehicle system 1 does not use a wide area communication network 3 and uses a radio wave in a pre-assigned frequency band when making wireless communication with another in-vehicle system 1. It should be noted, however, that the in-vehicle system 1 is also capable of wirelessly communicating with another in-vehicle system 1 via the wide area communication network 3. That is, the in-vehicle system 1 is capable of making vehicle-to-vehicle communication either via the wide area communication network 3 or directly without using the wide area communication network 3.

Hereinafter, vehicle-to-vehicle communication without using the wide area communication network 3 will be referred to as direct vehicle-to-vehicle communication, and vehicle-to-vehicle communication via the wide area communication network 3 will be referred to as indirect vehicle-to-vehicle communication. A communication range is narrower in direct vehicle-to-vehicle communication than in indirect vehicle-to-vehicle communication. Hence, direct vehicle-to-vehicle communication may be referred to also as narrow area vehicle-to-vehicle communication and indirect vehicle-to-vehicle communication as wide area vehicle-to-vehicle communication.

A frequency band used in direct vehicle-to-vehicle communication is, for example, a 760 MHz band. Alternatively, a 2.4 GHz band or a 5.9 GHz band is also available. Any communication standards may be adopted to realize direct vehicle-to-vehicle communication. For example, WAVE (Wireless Access in Vehicular Environment) standards specified in IEEE 1609 standards or the like may be adopted.

In a case where the in-vehicle system 1 makes indirect vehicle-to-vehicle communication, the in-vehicle system 1 makes communication directly with a base station 4 connected to the wide area communication network 3. The wide area communication network 3 means a public telecommunication network provided by telecommunication companies, such as a mobile telephone network and the Internet.

The in-vehicle system 1 transmits a vehicle packet by either direct vehicle-to-vehicle communication or indirect vehicle-to-vehicle communication or by both. A vehicle packet includes a vehicle ID identifying the vehicle 2 incorporating the in-vehicle system 1 (hereinafter, referred to as a subject vehicle), subject vehicle track information based on which a track the subject vehicle is expected to take (hereinafter, referred to as a subject vehicle estimated track) is determined, and an acquisition time indicating a time when the subject vehicle track information is acquired. In a case where a vehicle packet is transmitted by indirect vehicle-to-vehicle communication, the center 5 receives the vehicle packet via the base station 4 and the wide area communication network 3.

In a case where a vehicle packet transmitted from any vehicle 2 other than the subject vehicle is received, the in-vehicle system 1 makes a determination whether there is a possibility of a collision between the subject vehicle and the vehicle. When determining that there is the possibility of the collision, the in-vehicle system 1 performs an attention-calling control as a vehicle control.

Upon receipt of a vehicle packet, the center 5 forwards the received vehicle packet to the in-vehicle system 1 mounted to another vehicle (peripheral vehicle) in a peripheral area to the in-vehicle system 1 as a transmitter of the vehicle packet. The peripheral area is a range within a predetermined vehicle-to-vehicle forward distance from the in-vehicle system 1 as the vehicle packet transmitter. The vehicle-to-vehicle forward distance is a distance of a straight line linking two vehicles and is different from a distance by way of the base station 4.

A location of the vehicle 2 that transmitted the vehicle packet is necessary to determine the peripheral area. The location is included in the vehicle packet. In addition, locations of the respective in-vehicle systems 1 are necessary to determine the in-vehicle system 1 as a receiver of the forwarded vehicle packet. To satisfy such necessities, the center 5 manages present locations of the vehicles 2.

Present locations of the vehicles 2 may be managed by using an unillustrated database. Present locations of the respective vehicles 2 are correlated with the vehicle IDs and the like and stored in the database. Hereinafter, a database indicating present locations of the vehicles 2 will be referred to as a location management database. The in-vehicle systems 1 may be configured to transmit the present locations to the center 5 at regular intervals to let the center 5 know the locations of the vehicles 2. It should be noted, however, that the in-vehicle systems 1 may be configured to exchange location information by direct vehicle-to-vehicle communication. In such a case, locations of multiple vehicles 2 may be transmitted to the center 5 not by all but by some of the in-vehicle systems 1. Meanwhile, the center 5 updates the location management database each time locations of the vehicles 2 are received. Locations saved in the location management database may be used instead of locations of the vehicles 2 included in the vehicle packets as a location of the vehicle 2 based on which the peripheral area is determined.

The vehicle-to-vehicle forward distance may be set to a constant value or determined dynamically based on a traveling speed or the like of the vehicle that transmitted the vehicle packet. Alternatively, the vehicle-to-vehicle forward distance may be adjusted dynamically based on a value set for a type of a road the vehicle that transmitted the vehicle packet is traveling. For example, when the vehicle is travelling an expressway, the vehicle-to-vehicle forward distance is set to a relatively large value (for example, 400 m). Meanwhile, when the vehicle is traveling a general road, the vehicle-to-vehicle forward distance is set to a value smaller than the value set for an expressway.

It is preferable that the vehicle-to-vehicle forward distance is longer than a communication enabled distance by direct vehicle-to-vehicle communication and shorter than a distance several times the communication enabled distance by direct vehicle-to-vehicle communication. Owing to the configuration as above, when indirect vehicle-to-vehicle communication is made, not only can a vehicle-to-vehicle communication distance be substantially increased, but also transmission of a vehicle packet to an unrelated communication party can be prevented. Several times means, for example, two or three times.

Upon receipt of a vehicle packet, the center 5 extracts any vehicle 2 present within the vehicle-to-vehicle forward distance from the vehicle that transmitted the vehicle packet by referring to the location management database and forwards the received vehicle packet to every extracted vehicle 2.

[Configuration of Vehicle-Mounted System 1]

Figure 2:
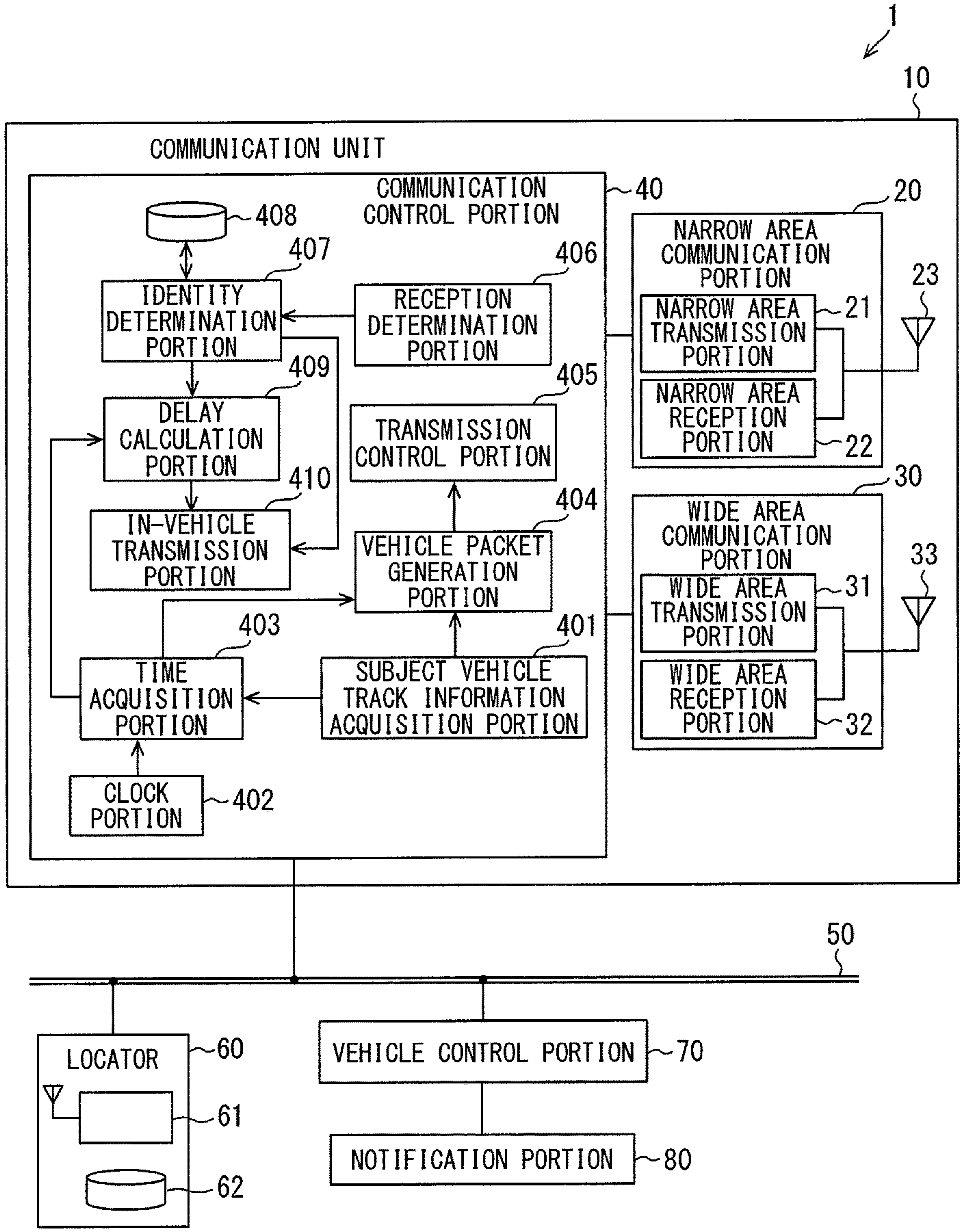
FIG. 2 is a view showing a configuration of an in-vehicle system.

A configuration of the in-vehicle system 1 will now be described. As is shown in FIG. 2, the in-vehicle system 1 includes a communication unit 10, a locator 60, a vehicle control portion 70, and a notification portion 80. The communication unit 10 is connected to the locator 60 and the vehicle control portion 70 via a LAN (Local Area Network) 50, which is a communication network constructed in a vehicle, and communicates with each. In short, the communication unit 10, the locator 60, and the vehicle control portion 70 are provided as separate bodies in the present embodiment.

The locator 60 is a device which indicates a spot the subject vehicle is presently traveling on a road map. The locator 60 includes a GNSS receiver 61 and a map storage portion 62. The GNSS receiver 61 receives a navigation signal transmitted from a navigation satellite provided to a GNSS (Global Navigation Satellite System) as a satellite navigation system and calculates a present location one after another based on the received navigation signal. Owing to the GNSS receiver 61, the locator 60 is capable of outputting a UTC time, that is, a present time in Coordinated Universal Time representation in a same manner as a typical GNSS receiver. The UTC time outputted from the locator 60 is used to correct a time measured by a clock portion 402 included in the communication unit 10.

The map storage portion 62 preliminary stores road map data indicating connection relationships of roads and shapes of roads (in other words, road structures). The map storage portion 62 is realized by using a non-volatile storage medium, such as a hard disk drive.

The locator 60 identifies a location of the subject vehicle on the road map based on the present location detected by the GNSS receiver 61. A location of a vehicle on the road map may be identified with the aid of an existing map matching technique commonly used in a navigation device. The map matching technique is a technique to find a present location of a vehicle by finding a traveled track of the vehicle from locations of the vehicle at multiple times and by comparing the traveled track of the vehicle with a road shape acquired from map information. The locator 60 successively provides location information indicating a present location to the communication unit 10. The locator 60 only has to be furnished with the function described above. In a case where a navigation device is mounted to the subject vehicle, the navigation device may be used as the locator 60.

The vehicle control portion 70 is a computer including a CPU, a RAM, a ROM, an input-output, and a bus line interconnecting the foregoing components, and the like. A program causing the computer to function as the vehicle control portion 70 is stored in the ROM. The program only has to be stored in a non-transitory tangible storage medium and may be stored in a storage medium other than the ROM. Running the program stored in the ROM on the CPU corresponds to performing a method in accordance with the program. A control performed by the vehicle control portion 70 will be described below by using FIG. 5.

The notification portion 80 includes a display and a speaker and outputs an attention-calling message from the display and the speaker under control of the vehicle control portion 70.

[Configuration of Communication Unit 10]

The communication unit 10 is a unit enabling transmission and reception of a vehicle packet between the subject vehicle and the in-vehicle system 1 mounted to a vehicle present near the subject vehicle (hereinafter, referred to as a peripheral vehicle). The communication unit 10 includes a narrow area communication portion 20, a wide area communication portion 30, and a communication control portion 40. Each of the narrow area communication portion 20 and the wide area communication portion 30 is connected to the communication control portion 40 to make communication with each other.

The narrow area communication portion 20 is a communication module making direct wireless communication (that is, direct vehicle-to-vehicle communication) with another vehicle by using a radio wave in a predetermined frequency band. The narrow area communication portion 20 includes a narrow area transmission portion 21, a narrow area reception portion 22, and an antenna 23. The antenna 23 is an antenna at which a radio wave in a frequency band used in direct vehicle-to-vehicle communication is transmitted and received.

The narrow area reception portion 22 demodulates a signal received at the antenna 23 and provides the demodulated signal to the communication control portion 40. The narrow area transmission portion 21 modulates data inputted from the communication control portion 40 and outputs the modulated data to the antenna 23. The antenna 23 radiates the received data as a radio wave (that is, by wireless transmission). An access control in direct vehicle-to-vehicle communication is performed by using CSMA with CA (Carrier Sense Multiple Access with Collision Avoidance). Access control processing by using the CSMA with CA may be performed by either the narrow area transmission portion 21 or the communication control portion 40. A transmission method adopted in the present embodiment is a broadcast method. However, a unicast or multicast method may be adopted instead.

The wide area communication portion 30 is a communication module wirelessly connecting to the wide area communication network 3 to enable the in-vehicle system 1 to communicate with another communication device via the wide area communication network 3. The wide area communication portion 30 includes a wide area transmission portion 31, a wide area reception portion 32, and an antenna 33.

The antenna 33 is an antenna at which a radio wave in a predetermined frequency band used in wireless communication with the base station 4 is transmitted and received. The wide area reception portion 32 demodulates a signal transmitted from the base station 4 and received at the antenna 33 and provides the demodulated signal to the communication control portion 40. The wide area transmission portion 31 modulates data inputted from the communication control portion 40 and outputs the modulated data to the antenna 33. The antenna 33 radiates the input data as a radio wave (that is, by wireless transmission).

The communication control portion 40 has a function of generating a vehicle packet and transmitting the vehicle packet from at least one of the narrow area transmission portion 21 and the wide area transmission portion 31. The communication control portion 40 also has a function of outputting data generated based on a vehicle packet received by at least one of the narrow area reception portion 22 and the wide area reception portion 32 to the vehicle control portion 70.

[Configuration of Communication Control Portion 40]

To execute the functions described above, the communication control portion 40 includes, as is shown in FIG. 2, a subject vehicle track information acquisition portion 401, a clock portion 402, a time acquisition portion 403, a vehicle packet generation portion 404, a transmission control portion 405, a reception determination portion 406, an identity determination portion 407, a memory 408, a delay calculation portion 409, and an in-vehicle transmission portion 410.

The communication control portion 40 is formed as a computer including a CPU, a RAM, a ROM, an input-output, a bus line interconnecting the foregoing components, and the like. A program causing the computer to function as the communication control portion 40 (hereinafter, referred to as a communication control program), the vehicle ID, and so on are stored in the ROM. The communication control program only has to be stored in a non-transitory tangible storage medium and may be stored in a storage medium other than the ROM. For example, the communication control program may be saved in a flash memory. Running the communication control program on the CPU corresponds to performing a method in accordance with the communication control program. By running the communication control program stored in the ROM on the CPU, various functions shown in FIG. 2 are provided by the communication control portion 40.

Functional blocks included in the communication control portion 40, either in part or in whole, may be realized by using one or more than one IC or the like (in other words, by hardware). Alternatively, the functional blocks included in the communication control portion 40, either in part or in whole, may be realized by combining software run on the CPU and hardware members.

The subject vehicle track information acquisition portion 401 acquires subject vehicle track information. The subject vehicle track information is information based on which a track the subject vehicle is expected to take, that is, a subject vehicle estimated track is determined. To be more specific, the subject vehicle track information includes a present location, a speed, and a traveling direction of the subject vehicle in the present embodiment. A present location of the subject vehicle is acquired from the locator 60 and a speed is acquired from an unillustrated vehicle speed sensor. A traveling direction is determined based on a change in present location of the subject vehicle.

In the present embodiment, the subject vehicle track information is acquired at an instant when a distance from a location of the subject vehicle to a crossing point becomes equal to a first attention-calling distance. The crossing point is an intersection or a merging point. The first attention-calling distance is preliminarily set based on a distance within which any other vehicle 2 headed for the crossing point is recommended to take a caution against the subject vehicle. For example, the first attention-calling distance is within a range from 50 m to 100 m. Whether a distance from a location of the subject vehicle to the crossing point becomes equal to the first attention-calling distance is determined based on information from the locator 60. Such a determination is made at regular intervals while the communication control portion 40 is energized. The communication control portion 40 is energized, for example, while an ignition switch stays ON.

The subject vehicle track information acquisition portion 401 notifies the time acquisition portion 403 that processing to acquire the subject vehicle track information has been performed. Such a notification may be made at an instant when the subject vehicle track information is actually acquired or at an instant when an acquisition request for the subject vehicle track information is outputted to the LAN 50. The subject vehicle track information acquisition portion 401 outputs the acquired subject vehicle track information to the vehicle packet generation portion 404.

The clock portion 402 successively measures a present time. The clock portion 402 is also furnished with a function of correcting a present time to a UTC time when the UTC time is supplied from the locator 60.

Upon receipt of a notice from the subject vehicle track information acquisition portion 401 informing that the processing to acquire the subject vehicle track information has been performed, the time acquisition portion 403 acquires a present time from the clock portion 402 and outputs the acquired present time (hereinafter, referred to as an acquired time) to the vehicle packet generation portion 404. The time acquisition portion 403 also acquires a present time from the clock portion 402 at a request from the delay calculation portion 409 and outputs the acquired time to the delay calculation portion 409.

Once the subject vehicle track information and the acquired time are successfully received, the vehicle packet generation portion 404 generates a vehicle packet including the subject vehicle track information, the acquired time, and the vehicle ID. A header identifying as being a vehicle packet is appended to the vehicle packet. The vehicle packet thus generated is outputted to the transmission control portion 405. In the present embodiment, a packet means entire data including the subject vehicle track information, the acquired time, and the vehicle ID, and does not mean a unit of data divided to a certain amount at a time of transmission. A definition of a vehicle packet as above does not necessarily mean that a vehicle packet is divided into multiple items of data when transmitted.

Upon input of a vehicle packet, the transmission control portion 405 transmits the vehicle packet from one or both of the narrow area transmission portion 21 and the wide area transmission portion 31. In a case where the vehicle packet is transmitted from both of the narrow area transmission portion 21 and the wide area transmission portion 31, the transmission control portion 405 outputs the vehicle packet to each of the narrow area transmission portion 21 and the wide area transmission portion 31.

When the vehicle packet is outputted to each of the narrow area transmission portion 21 and the wide area transmission portion 31, the vehicle packet is wirelessly transmitted from the narrow area transmission portion 21 via the antenna 23 while the vehicle packet is also transmitted from the wide area transmission portion 31 via the antenna 33. It should be noted, however, that a vehicle packet is not necessarily transmitted from the narrow area transmission portion 21 and the wide area transmission portion 31 as soon as the vehicle packet is inputted into the transmission control portion 405.

As has been described above, a vehicle packet is transmitted from the narrow area transmission portion 21 after the vehicle packet is processed by using the CSMA with CA as an access control method. Also, a vehicle packet is transmitted from the wide area transmission portion 31 after the vehicle packet is processed in accordance with predetermined communication standards for the wide area communication network 3. An example of the communication standards for the wide area communication network 3 is an LTE (Long Term Evolution). In accordance with the LTE, the communication unit 10 communicates with the base station 4 and performs internal processing for allocation of a resource block. The communication unit 10 transmits a vehicle packet by using a resource block allocated as a result.

The processing as above is necessary. In addition, processing to transmit a vehicle packet from the narrow area transmission portion 21 and the wide area transmission portion 31 is performed simultaneously and in parallel with another processing by sharing time or the like in some case. Accordingly, waiting may possibly occur until processing to transmit a vehicle packet is performed. Hence, the vehicle packet is not necessarily transmitted from the narrow area transmission portion 21 and the wide area transmission portion 31 as soon as the vehicle packet is inputted into the transmission control portion 405. In addition, even when the transmission control portion 405 starts to control the narrow area transmission portion 21 and the wide area transmission portion 31 at a same time to transmit vehicle packets, the vehicle packets are not necessarily transmitted from the narrow area transmission portion 21 and the wide area transmission portion 31 at a same time.

The process of controlling the narrow area transmission portion 21 to transmit the vehicle packet and the process of controlling the wide area transmission portion 31 to transmit the vehicle packet may be performed by the transmission control portion 405 or may be performed by the narrow area transmission portion 21 and the wide area transmission portion 31.

Upon supply of a vehicle packet, the narrow area transmission portion 21 modulates the vehicle packet and broadcasts the modulated vehicle packet from the antenna 23. Upon supply of a vehicle packet, the wide area transmission portion 31 also modulates the vehicle packet and transmits the modulated vehicle packet from the antenna 33. The vehicle packet transmitted from the antenna 33 is received by the base station 4 and forwarded to the center 5 from the base station 4 via the wide area communication network 3. At the base station 4, a time is also required for processing to transmit the vehicle packet to the center 5. Processing in the base station 4 is more likely to delay when a volume of data transmitted from terminals, such as the communication unit 10, and processed at a same time in the base station 4 increases.

In a case where a vehicle packet is transmitted from the narrow area transmission portion 21 in the in-vehicle system 1 mounted to another vehicle 2 and the subject vehicle is allowed to communicate with the vehicle 2 by narrow area communication, the vehicle packet transmitted from the vehicle 2 is received by the narrow area reception portion 22 via the antenna 23.

In a case where the subject vehicle is in the peripheral area determined by the center 5 in reference to a location of another vehicle 2, a vehicle packet transmitted from the vehicle 2 in question is transmitted from the center 5. The vehicle packet transmitted from the center 5 is received by the wide area reception portion 32 via the antenna 33.

The reception determination portion 406 successively acquires data received by the narrow area reception portion 22 and the wide area reception portion 32 and determines whether data received by the narrow area reception portion 22 and the wide area reception portion 32 is a vehicle packet transmitted from another vehicle 2 each time the data is acquired. Such a determination is made by analyzing, for example, the header. In a case where reception of a vehicle packet is determined, the reception determination portion 406 outputs the vehicle packet to the identity determination portion 407.

In a case where reception of a vehicle packet is determined by the reception determination portion 406, the identity determination portion 407 determines whether the received vehicle packet is same as a vehicle packet stored in the memory 408. Such a determination is made by, for example, checking a match of both of the vehicle ID and the acquired time between the vehicle packets.

Both of the vehicle ID and the acquired time match between the vehicle packets only when a same vehicle packet is transmitted from the narrow area transmission portion 21 and the wide area transmission portion 31 of another vehicle 2 and received by both of the narrow area reception portion 22 and the wide area reception portion 32 of the subject vehicle. Hence, a determination by the identity determination portion 407 is to determine whether the vehicle packet received by the wide area reception portion 32 is same as the vehicle packet received by the narrow area reception portion 22.

In a case where identity between the received vehicle packet and the vehicle packet stored in the memory 408 is not determined (the former and the latter are not same), the identity determination portion 407 transmits the vehicle track information and the vehicle ID included in the received vehicle packet to the in-vehicle transmission portion 410 and saves the vehicle track information and the vehicle ID in the memory 408 for a predetermined time. The identity determination portion 407 also outputs the acquired time included in the received vehicle packet to the delay calculation portion 409.

Meanwhile, in a case where identity between the received vehicle packet and the vehicle packet stored in the memory 408 is determined, the identity determination portion 407 discards the received vehicle packet.

Upon input of the acquired time from the identity determination portion 407, the delay calculation portion 409 makes the time acquisition portion 403 acquire a present time and acquires the present time from the time acquisition portion 403. The present time thus acquired will be referred to as a reception time. A difference between the reception time and the acquired time is calculated, which will be hereinafter referred to as a communication delay time $\Delta T$. The communication delay time $\Delta T$ thus calculated is outputted to the in-vehicle transmission portion 410.

Upon supply of the vehicle track information and the vehicle ID from the identity determination portion 407, the in-vehicle transmission portion 410 outputs the vehicle track information and the vehicle ID thus supplied and the communication delay time $\Delta T$ supplied from the delay calculation portion 409 to the vehicle control portion 70. The in-vehicle transmission portion 410 functioning to output the communication delay time $\Delta T$ to the vehicle control portion 70 corresponds to a delay time output portion.

[Vehicle Packet Transmission Processing]

Figure 3:
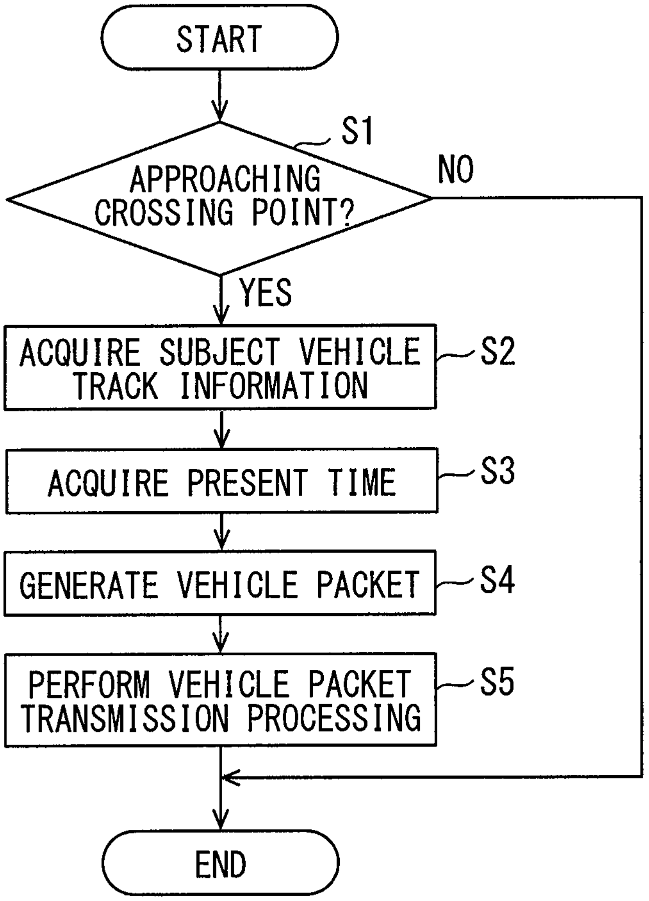
FIG. 3 is a flowchart depicting vehicle packet transmission processing performed by a communication control portion of FIG. 2.

Vehicle packet transmission processing performed by the communication control portion 40 will now be described by using a flowchart of FIG. 3. The following will describe a case where processing of FIG. 3 is performed by the communication control portion 40 in the in-vehicle system 1*a* mounted to the first vehicle 2*a*. Herein, the in-vehicle system 1*a* functions as the first vehicle control device. The subject vehicle track information acquisition portion 401 corresponds to a first vehicle information acquisition portion and the narrow area transmission portion 21 and the wide area transmission portion 31 correspond to a first vehicle transmission portion.

The communication control portion 40 repetitively performs the processing depicted in the flowchart of FIG. 3 at regular intervals, for example, 100 milliseconds. In the following, S stands for step. S1 and S2 are performed by the subject vehicle track information acquisition portion 401. At S1, whether the first vehicle 2*a* is approaching a crossing point is determined. To be more specific, a determination is made as to whether a distance from the first vehicle 2*a* to the crossing point changes from a distance longer than the first attention-calling distance to a distance equal to or less than the first attention-calling distance. Such a determination is made by using a location of the first vehicle 2*a* identified by the locator 60 and the road map data stored in the map storage portion 62 in the locator 60. As has been described above, the crossing point is an intersection or a merging point.

In a case where the determination made at S1 is NO, the processing of FIG. 3 is ended. Meanwhile, in a case where the determination made at S1 is YES, advancement is made to S2. At S2, the subject vehicle track information is acquired. The subject vehicle track information acquired by the in-vehicle system 1*a* mounted to the first vehicle 2*a* corresponds to first vehicle track information and also to first vehicle information.

As has been described above, the subject vehicle track information includes a present location, a speed, and a traveling direction of the subject vehicle, herein the first vehicle 2*a*. The present location may be the present location used for the determination at S1 or acquired from the locator 60 at S2.

Processing at S3 is performed by the time acquisition portion 403 to acquire a present time. Processing at S4 is performed by the vehicle packet generation portion 404 to generate a vehicle packet including the present time acquired at S3 as the acquired time, the subject vehicle track information acquired at S2, and the vehicle ID.

Hereinafter, a vehicle packet generated by the in-vehicle system 1 a mounted to the first vehicle 2*a* will be referred to as a first vehicle packet, the acquired time included in the first vehicle packet as a first time, and the subject vehicle track information included in the first vehicle packet as first vehicle track information.

Processing at S5 is performed by the transmission control portion 405 to transmit the first vehicle packet generated at S4 from one or both of the narrow area transmission portion 21 and the wide area transmission portion 31. The processing has been described in detail above and the description is not repeated.

[Vehicle Packet Reception Processing]

Vehicle packet reception processing performed by the communication control portion 40 will now be described by using a flowchart of FIG. 4. The following will describe a case where the communication control portion 40 in the in-vehicle system 1*b* mounted to the second vehicle 2*b* performs the processing of FIG. 4. Herein, the in-vehicle system 1*b* functions as the second vehicle control device. The narrow area reception portion 22 and the wide area reception portion 32 correspond to a second vehicle reception portion. Also, the second vehicle 2*b* is in a periphery of the first vehicle 2*a*, that is, the second vehicle 2*b* is a peripheral vehicle present near the first vehicle 2*a*, which means that any vehicle 2 present near the second vehicle 2*b* is deemed as being the first vehicle 2*a*.

Figure 4:
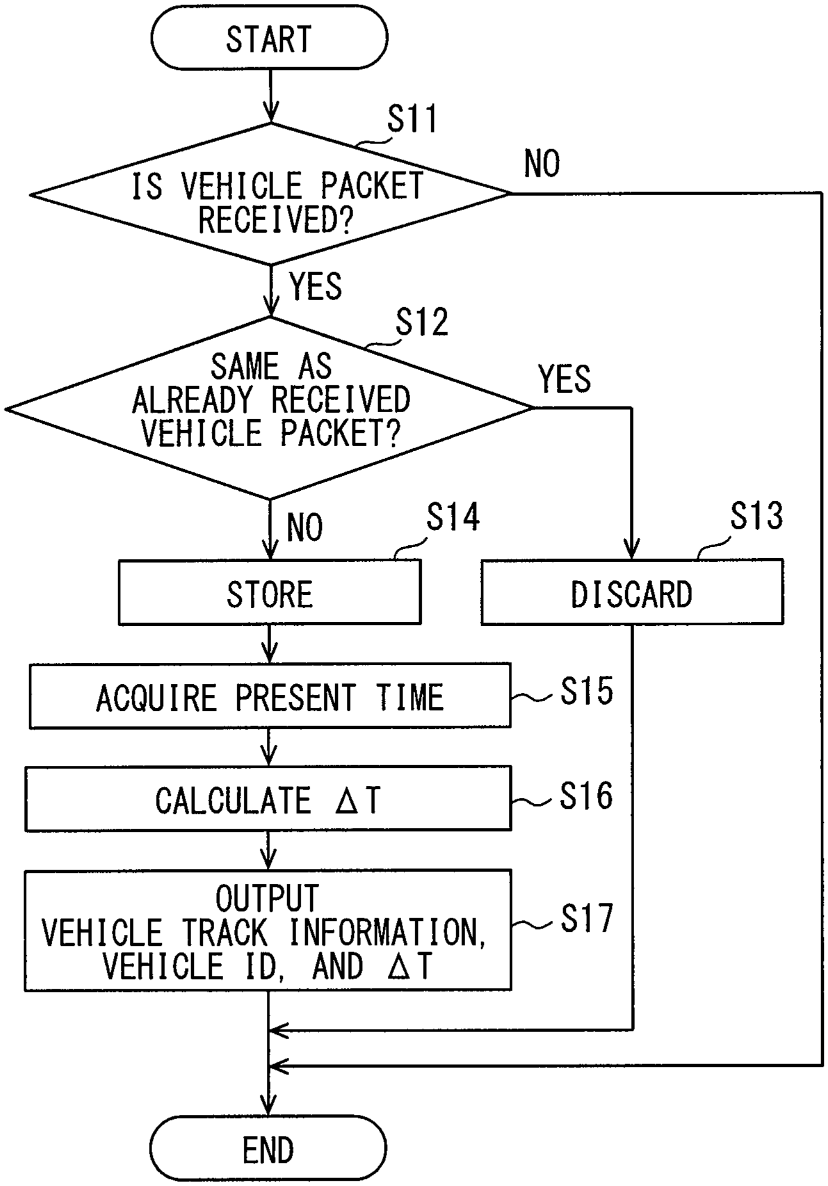
FIG. 4 is a flowchart depicting vehicle packet reception processing performed by the communication control portion of FIG. 2.

The communication control portion 40 also repetitively performs processing depicted in the flowchart of FIG. 4 at regular intervals, for example, 100 milliseconds. Processing at S11 is performed by the reception determination portion 406 to determine whether a vehicle packet is received. Such a determination is made by analyzing signals acquired from the narrow area reception portion 22 and the wide area reception portion 32. In a case where the determination made at S11 is NO, the processing of FIG. 4 is ended. Meanwhile, in a case where the determination made at S11 is YES, advancement is made to S12.

Processing at S12 through S14 is performed by the identity determination portion 407. At S12, a determination is made as to identity between the vehicle packet, reception of which is determined at S11, and the vehicle packet already received and stored in the memory 408. In a case where the determination made at S12 is YES, advancement is made to S13.

At S13, the most recently received vehicle packet is discarded. In a case where the determination made at S12 is YES, advancement is made to S14. At S14, the most recently received vehicle packet is stored in the memory 408. Although it is not depicted in FIG. 4, the vehicle packet stored in the memory 408 is erased from the memory 408 when a predetermined time elapses.

Processing at S15 is performed by the time acquisition portion 403 to acquire a present time. In a case where the first vehicle packet is received, the present time means a time when reception of the first vehicle packet is determined and will be referred to as a second time. Herein, the time acquisition portion 403 functions as a second time acquisition portion. Because the first vehicle 2*a* is a peripheral vehicle present near the second vehicle 2*b*, the first vehicle packet corresponds to a vehicle packet transmitted from a peripheral vehicle present near the second vehicle 2*b*, that is, a peripheral vehicle packet. The first vehicle track information included in the first vehicle packet corresponds to peripheral vehicle information.

Processing at S16 is performed by the delay calculation portion 409 to calculate the communication delay time $\Delta T$ by subtracting the first time included in the first vehicle packet from the present time (second time) acquired at S15.

Processing at S17 is performed by the in-vehicle transmission portion 410 to output the first vehicle track information and the vehicle ID included in the most recently received vehicle packet and the communication delay time $\Delta T$ calculated at S16 to the vehicle control portion 70.

[Processing Performed by Vehicle Control Portion 70]

Figure 5:
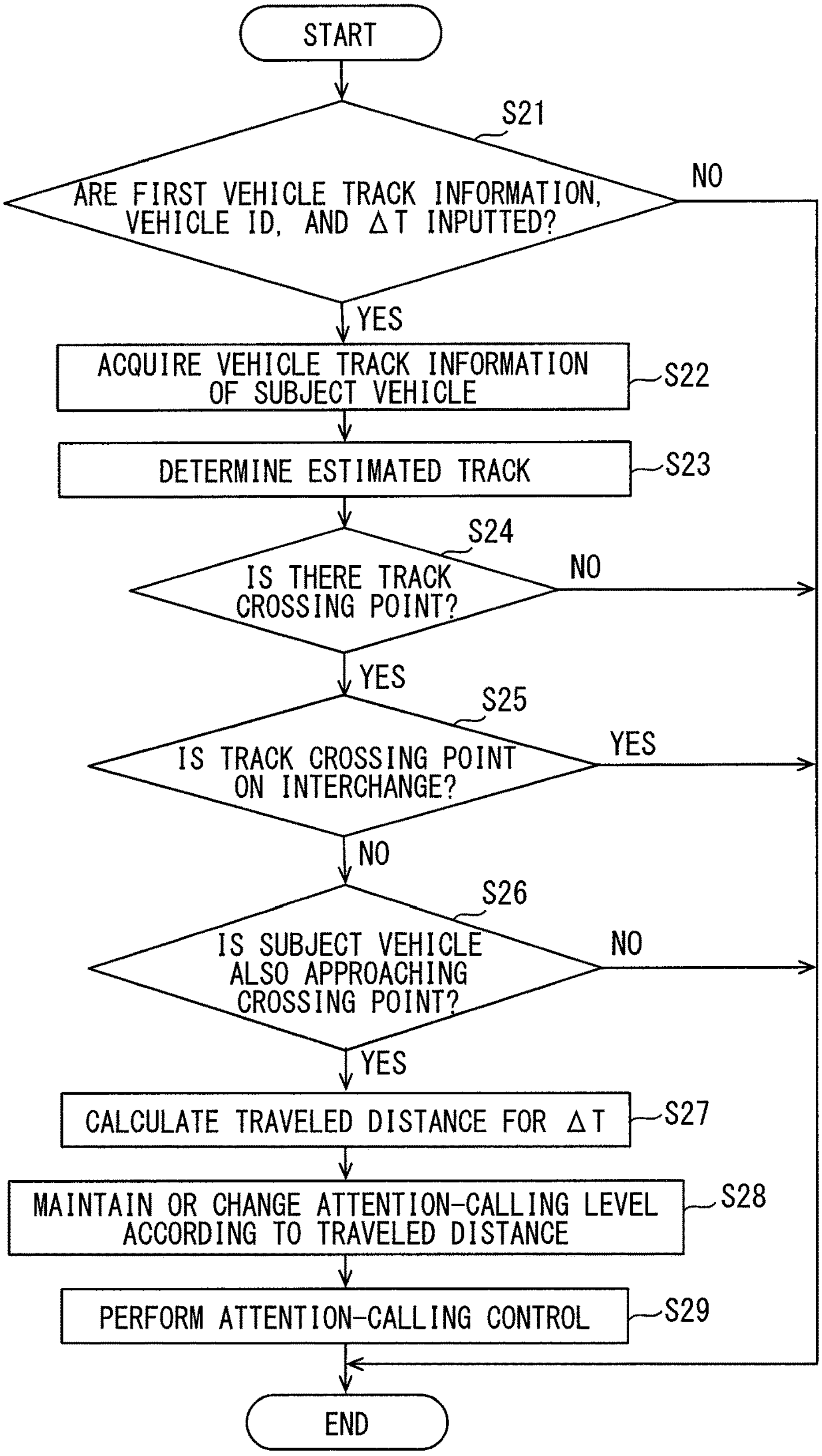
FIG. 5 is a flowchart depicting processing performed by a vehicle control portion of FIG. 2.

Processing performed by the vehicle control portion 70 will now be described by using a flowchart of FIG. 5. The following will describe a case where the vehicle control portion 70 in the in-vehicle system 1*b* mounted to the second vehicle 2*b* performs processing of FIG. 5. Herein, the vehicle control portion 70 corresponds to a second vehicle control portion. The vehicle control portion 70 repetitively performs the processing depicted in the flowchart of FIG. 5 at regular intervals, for example, 100 milliseconds or several dozen milliseconds.

At S21, a determination is made as to whether the first vehicle track information, the vehicle ID, and the communication delay time $\Delta T$ are inputted. In a case where the determination is NO, the processing of FIG. 5 is ended. Meanwhile, in a case where the determination made at S21 is YES, advancement is made to S22.

At S22 through S26, whether there is a possibility of a collision between the second vehicle 2*b* and the first vehicle 2*a* is determined. At S22, the vehicle track information of the subject vehicle (herein, the second vehicle 2*b*) is acquired. The vehicle track information acquired herein includes a present location, a speed, and a traveling direction of the second vehicle 2*b*.

At S23, a first vehicle estimated track, which is a feature track of the first vehicle 2*a*, and a second vehicle estimated track, which is a feature track of the second vehicle 2*b*, are determined. The first vehicle estimated track is determined by using the first vehicle track information and the second vehicle estimated track is estimated by using the vehicle track information acquired at S22.

At S24, whether there is a crossing point (hereinafter, referred to as a track crossing point) on the first vehicle estimated track and the second vehicle estimated track determined at S23 is determined. In a case where the determination made at S24 is NO, the processing of FIG. 5 is ended. Meanwhile, in a case where the determination made at S24 is YES, advancement is made to S25.

At S25, whether the track crossing point is on an interchange is determined. In a case where the determination is YES, the processing of FIG. 5 is ended, because the first vehicle 2*a* and the second vehicle 2*b* do not collide as long as the track crossing point is on the intersection. In a case where the determination made at S25 is NO, advancement is made to S26.

At S26, whether the subject vehicle (the second vehicle 2*b*) is also approaching the crossing point is determined. To be more specific, whether the second vehicle 2*b* is headed for the crossing point and a distance from the second vehicle 2*b* to the crossing point becomes equal to or less than a second attention-calling distance is determined. The second attention-calling distance is preliminarily set. The second attention-calling distance may be as long as the first attention-calling distance or longer or shorter than the first attention-calling distance. In a case where the determination made at S26 is NO, the processing of FIG. 5 is ended. Meanwhile, in a case where the determination made at S26 is YES, advancement is made to S27. When advancement is made to S27, it has been determined that there is the possibility of the collision between the second vehicle 2*b* and the first vehicle 2*a*.

At S27, a traveled distance the first vehicle 2*a* has traveled for the communication delay time ΔT is calculated by using the communication delay time ΔT, an input of which is determined at S21, and a vehicle speed of the first vehicle 2*a* included in the first vehicle track information, an input of which is also determined at S21.

At S28, an attention-calling level set at a default level is maintained or changed based on the traveled distance calculated at S27. To be more specific, the attention-calling level is changed by increasing the attention-calling level set at the default level with an increase in the traveled distance. The attention-calling level set at the default level is a level set on an assumption that the communication delay time ΔT is 0. That is, the attention-calling level set at the default level is a level set on a condition that a distance from a location of the second vehicle 2*b* to the crossing point is equal to the second attention-calling distance. In short, an attention-calling control performed when the attention-calling level is at the default level corresponds to a delay ignoring control.

By contrast, a distance from the second vehicle 2*b* to the crossing point becomes shorter than the second attention-calling distance at least by the traveled distance calculated at S27 by the time processing at S28 is performed. Hence, the attention-calling level is increased at S28 based on the traveled distance calculated at S27.

Figures 6, 7:
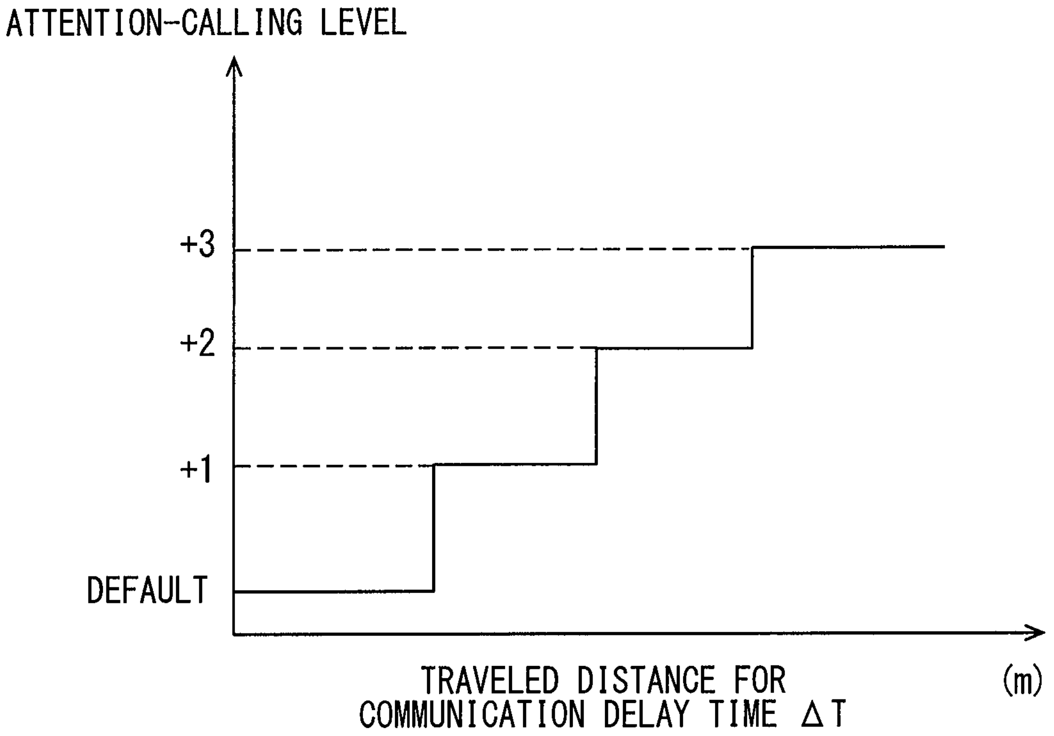
FIG. 6 is a view showing an example of a changed attention-calling level determined at S28 of FIG. 5.
FIG. 7 is a view showing an example of a relationship among the attention-calling level of FIG. 6, an attention-calling message, and an output style.

In FIG. 6, an example of the changed attention-calling level determined at S28 is shown. In the example of FIG. 6, the attention-calling level is increased step by step based on the traveled distance.

At S29, an attention-calling control corresponding to the attention-calling level changed at S28 is performed. The attention-calling control performed in the present embodiment is a control to output an attention-calling message from the display and the speaker provided to the notification portion 80. A control content changed with the attention-calling level is a content of an attention-calling message and an output style of the attention-calling message.

In FIG. 7, a relationship among the attention-calling level, the attention-calling message, and the output style is shown. An attention-calling message having a default content is a low-level message, which reads, for example, "Be aware of another vehicle". A medium-level message has a content attracting attention of a driver to another vehicle 2 more firmly than the low-level message. A high-level message is a message directing the driver to immediately take an action to avoid a collision with another vehicle 2.

In the present embodiment, an output style of the attention-calling message is not only to display the attention-calling message on the display provided to the notification portion 80 but also to flash a predetermined flashing region of the display. Herein, "to flash" means to blink the flashing region for a predetermined time. The flashing region may be a periphery along a region where the attention-calling message is being displayed, an entire surface of the display, or the region where the attention-calling message is being displayed.

The flashing region is not flashed in a default setting. A flashing interval is set to "long" and flashing brightness is set to "low" when the attention-calling level is increased by one step from the default level. The flashing interval is set to "medium" and the flashing brightness is also set to "medium" when the attention-calling level is increased by two steps from the default level. The flashing interval is set to "short" and the flashing brightness is set to "high" when the attention-calling level is increased by three steps from the default level. Specific "long", "medium", and "short" flashing intervals are set preliminarily and specific "low", "medium", and "high" flashing brightness are also set preliminarily. The driver more readily becomes aware of an output of the attention-calling message as the flashing interval becomes shorter. Also, the driver more readily becomes aware of an output of the attention-calling message as the flashing brightness is increased.

The attention-calling control performed when the attention-calling level is at the default level corresponds to the delay ignoring control whereas the attention-calling control performed when the attention-calling level is higher than the default level corresponds to a delay considering control. A state in which the vehicle control portion 70 is allowed to perform the attention-calling control corresponding to the communication delay considering control can be said as a delay considering mode.

At S29, the attention-calling control is performed by outputting an attention-calling message in an output style determined by the relationship set forth in FIG. 7 and at the attention-calling level determined at S28. The attention-calling message may be displayed continuously for a predetermined time. Alternatively, it may be configured to display the attention-calling message and flash the flashing region alternately and to end both a display of the attention-calling message and flashing of the flashing region when a control performance time elapses. In a case where the attention-calling message is displayed continuously for a predetermined time, the flashing region may be flashed first, or the flashing region may be flashed at a same time when the attention-calling message is displayed.

[Summary of First Embodiment]

In the first embodiment described above, the attention-calling control is performed by maintaining the attention-calling level at the default level or raising the attention-calling level from the default level based on the communication delay time ΔT calculated as a difference between the first time when the in-vehicle system 1*a* mounted to the first vehicle 2*a* has acquired the first vehicle track information and the second time when reception of the first vehicle packet including the first vehicle track information is determined by the in-vehicle system 1*b* mounted to the second vehicle 2*b*.

Given that the first attention-calling distance is 100 m. Then, an attention-calling message corresponding to the attention-calling level at the default level is an attention-calling message against the first vehicle 2*a* assumed to be traveling 100 m before the crossing point. Given that the travelled distance calculated at S27 is 50 m. Also, given that the first vehicle 2*a* is travelling 100 m before the crossing point at a time T1 shown in FIG. 1 and the first vehicle 2*a* is travelling 50 m before the crossing point at a time T2.

Then, an attention-calling message outputted in the second vehicle 2*b* is an attention-calling message against the first vehicle 2*a* assumed to be traveling 100 m before the crossing point when the first vehicle 2*a* is actually traveling 50 m before the crossing point unless the communication delay time ΔT is considered. Hence, attention is called insufficiently.

By contrast, the attention-calling level is changed in consideration of the communication delay time ΔT and the attention-calling control is performed at the changed attention-calling level in the present embodiment. Accordingly, a control can be restricted from becoming insufficient even when there is the communication delay time ΔT. Consequently, the driver of the second vehicle 2*b* can be restricted from having a feeling of strangeness the driver may have otherwise by insufficiently called attention.

In the present embodiment, a traveled distance the first vehicle 2*a* has traveled for the communication delay time ΔT is calculated by multiplying the communication delay time ΔT by a vehicle speed of the first vehicle 2*a*, and the attention-calling level is determined based on the traveled distance. The communication delay time ΔT itself is a value calculated in consideration of a location of the first vehicle 2*a* when the attention-calling control is performed. However, by determining the attention-calling level based on the traveled distance, the attention-calling level can be determined more appropriately to a location of the first vehicle 2*a* when the attention-calling control is performed.

In the present embodiment, not only the attention-calling message but also an output style of the attention calling message is changed based on the attention-calling level. Hence, in a circumstance where it is crucial for the driver of the second vehicle 2*b* to become aware of the attention-calling message quickly, the driver of the second vehicle 2*b* more readily becomes aware of the attention-calling message.

In the present embodiment, even when there is a track crossing point, it is not determined that there is a possibility of a collision if the track crossing point is on an interchange. Hence, the attention-calling control can be restricted from being performed unnecessarily.

While the above has described the embodiment of the present disclosure, it should be appreciated that the present disclosure is not limited to the embodiment described above and various modifications described below are within the technical scope of the present disclosure. Besides the modifications described below, the present disclosure can be modified in various manners within the scope of the present disclosure.

(First Modification)

In the embodiment above, the in-vehicle system 1*a* mounted to the first vehicle 2*a* transmits the first vehicle packet only once when an approach of the first vehicle 2*a* to the crossing point is determined. In response, the second vehicle 2*b* performs the attention-calling control based on the first vehicle packet transmitted only once.

However, it may be configured to repeat S2 through S5 of FIG. 3 after an approach of the first vehicle 2*a* to the crossing point is determined. When configured as above, latest subject vehicle track information (that is, first vehicle track information) is successively determined and the first vehicle packet including the latest first vehicle track information is transmitted one after another. Transmission of the first vehicle packet is ended when a first vehicle packet transmission time has elapsed after the transmission is started or when the first vehicle 2*a* has traveled a first vehicle packet transmission distance after the transmission is started.

In a case where the in-vehicle system 1*a* mounted to the first vehicle 2*a* transmits the first vehicle packet one after another, the in-vehicle system 1*b* mounted to the second vehicle 2*b* sets an end condition to end the attention-calling control even when the first vehicle packet is being received one after another. The end condition is, for example, a detection of a recognition operation indicating that the driver of the second vehicle 2*b* has recognized the first vehicle 2*a*. The recognition operation is, for example, pressing of a button assigned for recognition of the first vehicle 2*a*. Alternatively, the recognition operation may be a braking operation.

Because the in-vehicle system 1*a* mounted to the first vehicle 2*a* transmits the first vehicle packet one after another, the reception determination portion 406 in the in-vehicle system 1*b* mounted to the second vehicle 2*b* is supposed to repetitively determine reception of the first vehicle packet. Hence, in a case where the reception determination portion 406 fails to determine reception of the first vehicle packet over a period longer than a reference time, a non-reception notice informing such a failure is transmitted to the vehicle control portion 70. The reference time is set to a time shorter than the first vehicle packet transmission time and also shorter than a time required for the first vehicle 2*a* to travel the first vehicle packet transmission distance.

In a case where the non-reception notice is received, the vehicle control portion 70 determines that a failure in reception of the first vehicle packet is not attributed to a malfunction of the communication unit 10 including the narrow area reception portion 22 and the wide area reception portion 32 because the communication unit 10 which has successfully transmitted the non-reception notice is functioning normally.

The vehicle control portion 70 ends the delay considering mode upon receipt of the non-reception notice and performs a preliminarily set control without received packet. The control without received packet is a control which can be performed even without the first vehicle packet. For example, the control without received packet is a control to make the notification portion 80 output a message informing an incapability of identifying a location of the first vehicle 2*a*.

In a case where such a message is outputted from the notification portion 80, the driver of the second vehicle 2*b* can know that the driver has to stay cautious about the first vehicle 2*a* even when the attention-calling message is no longer outputted.

(Second Modification)

Figure 8:
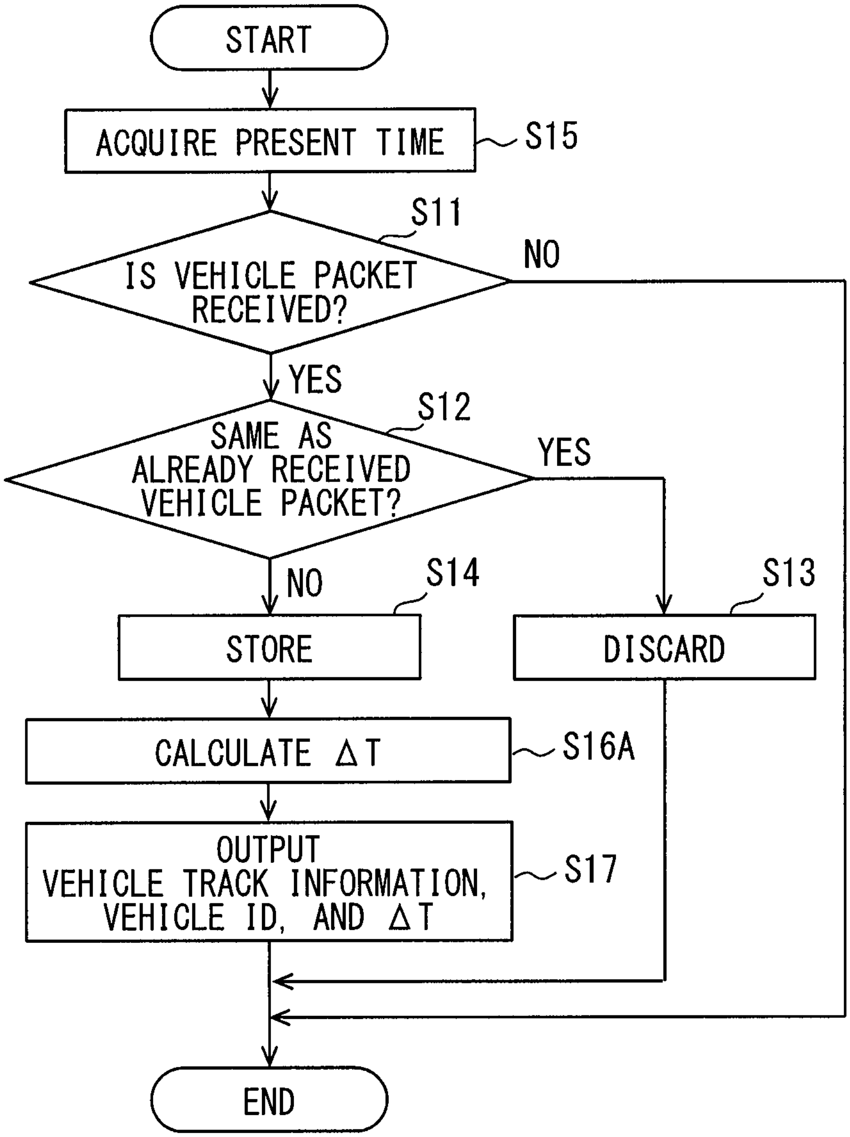
FIG. 8 is a flowchart depicting vehicle packet reception processing performed in a second modification.

In the embodiment above, a present time used as the second time is acquired after reception of a vehicle packet is determined. By contrast, as is depicted in FIG. 8, a present time is acquired by performing S15 before S11 in a second modification. Accordingly, a present time is acquired at regular intervals in the vehicle packet reception processing in the second modification. When reception of a new vehicle packet is determined, S16A is performed, in which a latest present time among times acquired as a present time by repetitively performing S15 is selected as the second time. The communication delay time ΔT is calculated from the second time thus selected and the first time included in the received vehicle packet.

When configured in the manner as above, the second time is acquired before a vehicle packet including the first time is received. Hence, it is no longer necessary to perform processing to acquire the second time after reception of the vehicle packet is determined. Accordingly, the following processing can be started earlier by saving a time required for the processing to acquire the second time.

(Third Modification)

In the embodiment above, a vehicle packet is generated and transmitted when an approach of the subject vehicle to the crossing point is determined. However, a vehicle packet may be generated and transmitted at regular intervals without determining whether the subject vehicle is approaching the crossing point. In such a case, an onset of a vehicle packet generation period is determined at S1 of FIG. 3 instead of determining an approach of the subject vehicle to the crossing point.

(Fourth Modification)

In the embodiment above, the vehicle control portion 70 performs the attention-calling control to call attention of the driver of the subject vehicle. However, a vehicle control performed by the vehicle control portion 70 may be an automatic control of behaviors of the subject vehicle. In such a case, the delay considering control is performed by increasing a control amount of the delay ignoring control by an amount determined based on the communication delay time ΔT.

(Fifth Modification)

In the embodiment above, the in-vehicle system 1*a* mounted to the first vehicle 2*a* transmits the first vehicle track information as the first vehicle information when an approach of a location of the first vehicle 2*a* to the crossing point is determined. In response, the in-vehicle system 1*b* mounted to the second vehicle 2*b* performs the attention-calling control when it is determined that the second vehicle 2*b* is also approaching the crossing point.

However, by allowing the in-vehicle system 1*a* mounted to the first vehicle 2*a* and the in-vehicle system 1*b* mounted to the second vehicle 2*b* to transmit and receive respective locations at regular intervals, the in-vehicle system 1*a* mounted to the first vehicle 2*a* becomes capable of determining when the in-vehicle system 1*b* mounted to the second vehicle 2*b* is to perform the attention-calling control against the first vehicle 2*a*. In such a case, it is not necessary to transmit the first vehicle track information as the first vehicle information and it is sufficient to transmit attention-calling direction information directing to start the attention-calling control against the first vehicle to the in-vehicle system 1*b* mounted to the second vehicle 2*b*.

(Sixth Modification)

In the embodiment above, the communication unit 10 includes two communication portions, namely the narrow area communication portion 20 and the wide area communication portion 30. However, the communication unit 10 may include either one of the narrow area communication portion 20 and the wide area communication portion 30.

(Seventh Modification)

In the embodiment above, the flashing region is flashed to let the driver of the second vehicle 2*b* more readily become aware of an output of the attention-calling message with the increase in the attention-calling level. However, an output style that lets the driver more readily become aware of the attention calling message is not limited to flashing of the flashing region. In a case where the attention-calling message is outputted on a display portion, a size of the attention-calling message may be changed instead.

In a case where the attention-calling message is outputted from the speaker as a sound, a volume of the sound may be changed. Alternatively, an alert signal sound may be inserted between attention-calling message sounds.

(Eighth Modification)

In the embodiment above, the attention-calling level is maintained or changed based on a traveled distance of the first vehicle 2*a* for the communication delay time ΔT, which is calculated by multiplying the communication delay time ΔT by a vehicle speed. However, the attention-calling level may be maintained or changed based on the communication delay time ΔT alone without consideration of a vehicle speed.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A vehicle control system comprising:

a first vehicle control device used in a first vehicle; and a second vehicle control device used in a second vehicle, wherein the first vehicle control device includes, a first vehicle information acquisition portion acquiring first vehicle information based on which the second vehicle control device in the second vehicle starts a vehicle control against the first vehicle, a vehicle packet generation portion acquiring a first time indicating a time when the first vehicle information is acquired and generating a first vehicle packet including the first time and the first vehicle information, and a first vehicle transmission portion transmitting the first vehicle packet, the second vehicle control device includes, a second vehicle reception portion receiving the first vehicle packet, a reception determining portion acquiring a signal received by the second vehicle reception portion and successively determining whether the first vehicle packet is received, a second time acquisition portion acquiring a second time indicating a time when the reception determining portion determines that the first vehicle packet is received, a delay calculation portion calculating a communication delay time that is a difference between the first time included in the first vehicle packet received by the second vehicle reception portion and the second time acquired by the second time acquisition portion, and a second vehicle control portion performing a delay considering control that is set by changing a delay ignoring control based on the communication delay time, the delay ignoring control being the vehicle control set based on the first vehicle information when assuming that the first time and the second time are same, the first vehicle information acquisition portion acquires first vehicle track information as the first vehicle information, the first vehicle track information being information for determining a first vehicle estimated track that is a future track of the first vehicle, and the second vehicle control portion determines the first vehicle estimated track based on the first vehicle track information included in the first vehicle packet received by the second vehicle reception portion, determines a second vehicle estimated track that is a feature track of the second vehicle, determines whether there is a possibility of a collision between the first vehicle and the second vehicle based on the first vehicle estimated track and the second vehicle estimated track, and operates in a delay considering mode in which the second vehicle control portion is allowed to perform the delay considering control in response to a determination that there is the possibility of the collision between the first vehicle and the second vehicle.

2. The vehicle control system according to claim 1, wherein when the second vehicle control portion determines that there is the possibility of the collision between the first vehicle and the second vehicle, the second vehicle control portion performs, as the delay considering control, an attention-calling control to call attention of a driver of the second vehicle, and in the attention-calling control, the second vehicle control portion performs an attention call of contents at an attention-calling level that is increased from an attention-calling level set in the delay ignoring control with an increase in the communication delay time.

3. The vehicle control system according to claim 2, wherein in the attention-calling control, the second vehicle control portion performs the attention call of the contents at the attention-calling level that is increased from the attention-calling level set in the delay ignoring control with the increase in the communication delay time and with an increase in a vehicle speed of the first vehicle.

4. The vehicle control system according to claim 2, wherein the attention-calling control is a control to output an attention-calling message for calling attention of the driver of the second vehicle while changing an output style so as to let the driver of the second vehicle more readily become aware of an output of the attention-calling message with the increase in the communication delay time.

5. The vehicle control system according to claim 1, wherein the second time acquisition portion acquires a time at regular intervals and uses a latest time among acquired times as the second time when the reception determination portion determines that the first vehicle packet is received.

6. The vehicle control system according to claim 1, wherein the first vehicle control device successively determines latest first vehicle track information and successively transmits the first vehicle packet including the latest first vehicle track information, the second vehicle control device includes a communication unit provided with the second vehicle reception portion, the reception determination portion, the second time acquisition portion, and the delay calculation portion separately from the second vehicle control portion, the reception determination portion notifies the second vehicle control portion of a state in which the first vehicle packet has not been received for a reference time or longer by transmitting a non-reception notice, and the second vehicle control portion sets an end condition to end the delay considering control while the second vehicle reception portion successively receiving the first vehicle packet, operates in the delay considering mode repetitively until the end condition is satisfied, and in response to a reception of the non-reception notice before the end condition is satisfied, determines that a failure in reception of the first vehicle packet is not attributed to a malfunction of the second vehicle reception portion and ends the delay considering mode to perform a packet non-receiving control that is preliminarily set.

7. The vehicle control system according to claim 1, wherein the second vehicle control device includes a map storage portion in which a road map is stored, and the second vehicle control portion determines whether the first vehicle estimated track and the second vehicle estimated track cross with each other, determines whether a crossing point of the first vehicle estimated track and the second vehicle estimated track is on an interchange based on the road map stored in the map storage portion when determining that the first vehicle estimated track and the second vehicle estimated track cross with each other, and determines that there is the possibility of the collision between the first vehicle and the second vehicle when determining that the crossing point is not on an interchange.

8. A vehicle control device used in a vehicle, comprising:

a reception portion receiving a peripheral vehicle packet that is a vehicle packet transmitted from a peripheral vehicle in a periphery of a subject vehicle using the vehicle control device and including peripheral vehicle information based on which the vehicle control device starts a vehicle control against the peripheral vehicle and a first time indicating a time when the peripheral vehicle information is generated;

a reception determination portion acquiring a signal received by the reception portion and determining whether the peripheral vehicle packet is received;

a second time acquisition portion acquiring a second time indicating a time when the reception determining portion determines that the peripheral vehicle packet is received;

a delay calculation portion calculating a communication delay that is a difference between the first time included in the peripheral vehicle packet received by the reception portion and the second time acquired by the second time acquisition portion; and a vehicle control portion performing a delay considering control that is set by changing a delay ignoring control based on the communication delay time, the delay ignoring control being the vehicle control set based on the peripheral vehicle information when assuming that the first time and the second time are same, wherein the vehicle control portion determines a surrounding vehicle estimated track that is a feature track of the surrounding vehicle based on surrounding vehicle track information included in the surrounding vehicle packet received by the reception portion and being information for determining the surrounding vehicle estimated track, determines a subject vehicle estimated track that is a feature track of the subject vehicle, determines whether there is a possibility of a collision between the surrounding vehicle and the subject vehicle based on the surrounding vehicle estimated track and the subject vehicle estimated track, and operates in a delay considering mode in which the subject vehicle control portion is allowed to perform the delay considering control in response to a determination that there is the possibility of the collision between the surrounding vehicle and the subject vehicle.

9. A vehicle control device used in a vehicle, comprising:

a reception portion receiving a peripheral vehicle packet that is a vehicle packet transmitted from a peripheral vehicle in a periphery of a subject vehicle using the vehicle control device and including peripheral vehicle information based on which the vehicle control device starts a vehicle control against the peripheral vehicle and a first time indicating a time when the peripheral vehicle information is generated;

a reception determination portion acquiring a signal received by the reception portion and successively determining whether the peripheral vehicle packet is received;

a second time acquisition portion acquiring a second time indicating a time when the reception determination portion determines that the peripheral vehicle packet is received;

a delay calculation portion calculating a communication delay that is a difference between the first time included in the peripheral vehicle packet received by the reception portion and the second time acquired by the second time acquisition portion;

a delay time output portion outputting the communication delay time calculated by the delay calculation portion to a vehicle control portion that is used in the subject vehicle and performs a control determined based on the peripheral vehicle information; and a vehicle control portion performing a delay considering control that is set by changing a delay ignoring control based on the communication delay time, the delay ignoring control being the vehicle control set based on the peripheral vehicle information when assuming that the first time and the second time are same, wherein the second time acquisition portion acquires a time at regular intervals and uses a latest time among acquired times as the second time when the reception determination portion determines that the surrounding vehicle packet is received.

10. A vehicle control system comprising:

a first vehicle control device used in a first vehicle; and a second vehicle control device used in a second vehicle, wherein the first vehicle control device includes, a first vehicle information acquisition portion acquiring first vehicle information based on which the second vehicle control device in the second vehicle starts a vehicle control against the first vehicle, a vehicle packet generation portion acquiring a first time indicating a time when the first vehicle information is acquired and generating a first vehicle packet including the first time and the first vehicle information, and a first vehicle transmission portion transmitting the first vehicle packet, the second vehicle control device includes, a second vehicle reception portion receiving the first vehicle packet, a reception determining portion acquiring a signal received by the second vehicle reception portion and successively determining whether the first vehicle packet is received, a second time acquisition portion acquiring a second time indicating a time when the reception determining portion determines that the first vehicle packet is received, a delay calculation portion calculating a communication delay time that is a difference between the first time included in the first vehicle packet received by the second vehicle reception portion and the second time acquired by the second time acquisition portion, and a second vehicle control portion performing a delay considering control that is set by changing a delay ignoring control based on the communication delay time, the delay ignoring control being the vehicle control set based on the first vehicle information when assuming that the first time and the second time are same, and the second time acquisition portion acquires a time at regular intervals and uses a latest time among acquired times as the second time when the reception determination portion determines that the first vehicle packet is received.

* * * * *